United States Patent [19]
Lo

[11] Patent Number: 5,379,480
[45] Date of Patent: Jan. 10, 1995

[54] DEVICE FOR CLEARING IRON CHIPS PRODUCED DURING A MECHANICAL WORKING PROCESS

[76] Inventor: Neng S. Lo, No. 546, Sec. 1, Feng Shih Rd., Fengyuan City, Taichung Hsien, Taiwan, Prov. of China

[21] Appl. No.: 231,390

[22] Filed: Apr. 22, 1994

[51] Int. Cl.[6] ............... B23Q 11/08; F16C 17/00
[52] U.S. Cl. ................ 15/246; 15/256.5; 277/24; 277/199; 384/16
[58] Field of Search ............ 15/256.5, 246, 236.01; 277/24, 181, 199, 207 A, 215; 285/302; 384/16; 409/235

[56] References Cited

U.S. PATENT DOCUMENTS

| | | | |
|---|---|---|---|
| 3,603,651 | 9/1971 | Weber | 384/16 |
| 3,964,801 | 6/1976 | Steinmetz | 15/256.5 |
| 5,058,232 | 10/1991 | Stohr | 15/256.5 |

FOREIGN PATENT DOCUMENTS

| | | | |
|---|---|---|---|
| 0135462 | 5/1979 | Germany | 15/246 |
| 2094677 | 9/1982 | United Kingdom | 15/246 |

*Primary Examiner*—Edward L. Roberts
*Attorney, Agent, or Firm*—Poms, Smith, Lande & Rose

[57] ABSTRACT

A device is provided for clearing iron chips produced during a mechanical working process and includes a plurality of telescopic housings. A fastening member is securely attached to an underside of an upper plate of the telescopic housing and has a first side wall member and a second side wall member. A first socket is defined through an underside of the first side wall member and a second socket is defined through an underside of the second side wall member. A resilient member is securely attached to the fastening member and includes a first locking element which is formed on the first side of the resilient member and is securely received in the first socket. A first protrusion portion formed on an underside of the first locking element has a first clearing edge portion extending outwardly therefrom. A second locking element formed on the second side of the resilient member is securely received in the second socket. A second protrusion portion formed on an underside of the second locking element has a second clearing edge portion extending outwardly therefrom. A second lug portion extends from the first side of the resilient member and a third clearing edge portion extends outwardly from a distal end thereof for clearing iron chips produced during a mechanical working process.

3 Claims, 4 Drawing Sheets

DEVICE FOR CLEARING IRON CHIPS PRODUCED DURING A MECHANICAL WORKING PROCESS

BACKGROUND OF THE INVENTION

1. Field of Invention

The present invention relates to a clearing device, and more particularly to a device for clearing iron chips produced during a mechanical working process.

2. Related Prior Art

A conventional device for clearing iron chips produced during a mechanical working process has a loose structure and is easily detached unintentionally, thus causing an inconvenience in the clearing process. In addition, the conventional clearing device creates noise easily, thereby causing discomfort to the users. There will be a more complete and sufficient illustration in the detailed description of the preferred embodiments, concerning the conventional device for clearing iron chips produced in a mechanical working process.

The present invention has arisen to mitigate and/or obviate the afore-mentioned disadvantages of the conventional clearing device.

SUMMARY OF THE INVENTION

The primary objective of the present invention is to provide a device for clearing iron chips produced during a mechanical working process.

In accordance with one aspect of the present invention, there is provided a device for clearing iron chips produced during a mechanical working process. The clearing device comprises a plurality of telescopic housings each having an upper plate, two side plates and a lower plate. A fastening member is securely attached to an underside of the upper plate of the telescopic housing and has a first side wall member and a second side wall member. A recess having a substantially rectangular cross-section is defined in an underside of the fastening member between the first and second side wall member thereof. A first socket is defined through an underside of the first side wall member and a second socket is defined through an underside of the second side wall member. A first lug portion extends outwardly from the first side wall member and a groove having an arc-shaped cross-section is defined in an underside thereof. A first flange portion laterally extends outwardly from the second side wall member. A resilient member is securely attached to the fastening member and comprises a block element having a substantially rectangular cross-section which is received in the substantially rectangular recess. A first locking element formed on the first side of the resilient member is securely received in the first socket. A first protrusion portion formed on an underside of the first locking element has a first clearing edge portion extending outwardly therefrom. A second locking element formed on the second side of the resilient member is securely received in the second socket. A second protrusion portion formed on an underside of the second locking element has a second clearing edge portion extending outwardly therefrom. A second lug portion having an arc-shaped cross-section extends from the first side of the resilient member and is partially enclosed in the arc-shaped groove. A third clearing edge portion extends outwardly from a distal end of the second arc-shaped lug portion for clearing iron chips produced during a mechanical working process. A second flange portion having an L-shaped cross-section is formed on the second side of the resilient member and is securely mounted on the first flange portion.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 6:
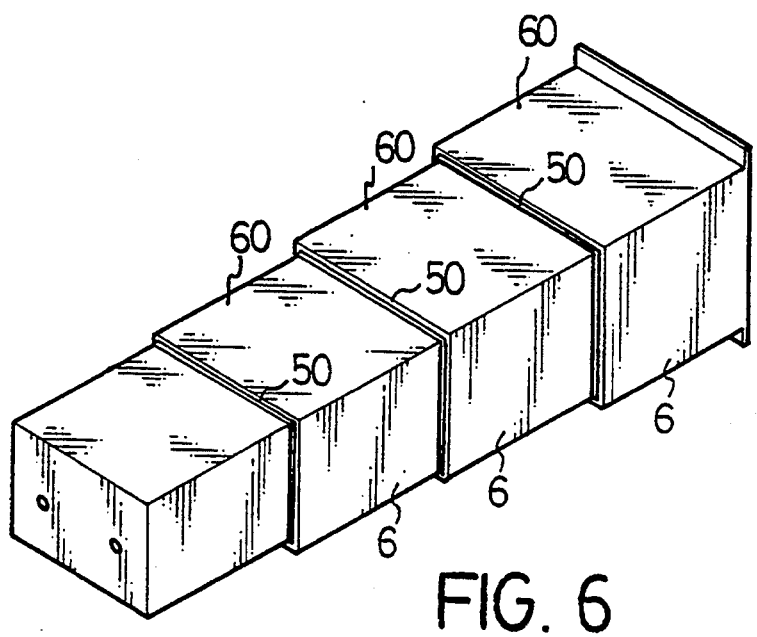
FIG. 6 is a perspective view of a conventional device for clearing iron chips produced during a mechanical working process in accordance with a prior art.
Figure 7:
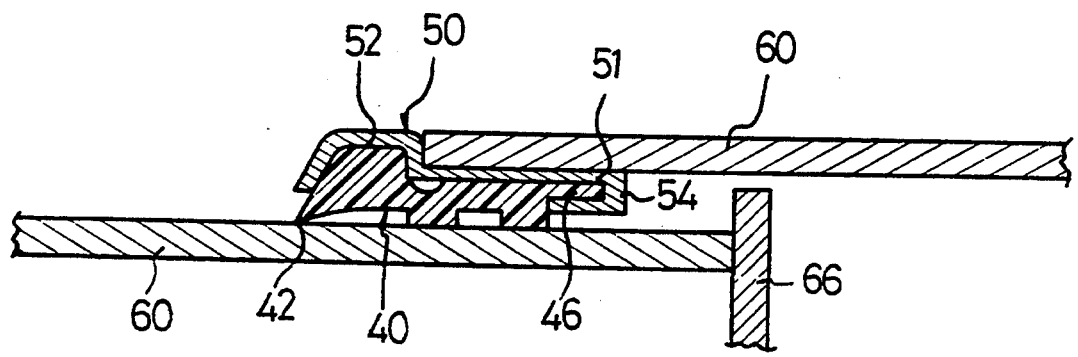
FIG. 7 is an enlarged side cross-sectional assembly view of the conventional clearing device as shown in FIG. 6.

For a better understanding of the features and benefits of the present invention, reference is made to FIGS. 6 and 7 illustrating a conventional device for clearing iron chips produced during a mechanical working process in accordance with the prior art.

Referring to FIGS. 6 and 7, a conventional clearing device comprises a plurality of telescopic housings 6 each having an upper plate 60, two side plates and a lower plate. The upper plate 60 has a distal end portion 66. A fastening member 50 is securely attached to an underside of the upper plate 60 of the telescopic housing 6. A groove 52 is defined in the fastening member 50. An L-shaped flange portion 54 is formed on a rear end of the fastening member 50 and defines a recess 51 therein. A resilient member 40 is fitted in the fastening member 50 and comprises a lug portion which is received in the groove 52 and a flange portion 46 which is securely received in the recess 51. A clearing edge portion 42 extends from a front end of the resilient member 40 for clearing iron chips produced during a mechanical working process.

By such an arrangement, the resilient member 40 is apt to be unintentionally detached from the fastening member 50, thereby causing an inconvenience in the clearing process. In addition, noise is created easily when the distal end portion 66 of the upper plate 60 on a lower position is in contact with the L-shaped flange portion 54 of the fastening member 50 on an upper position.

Figure 1:
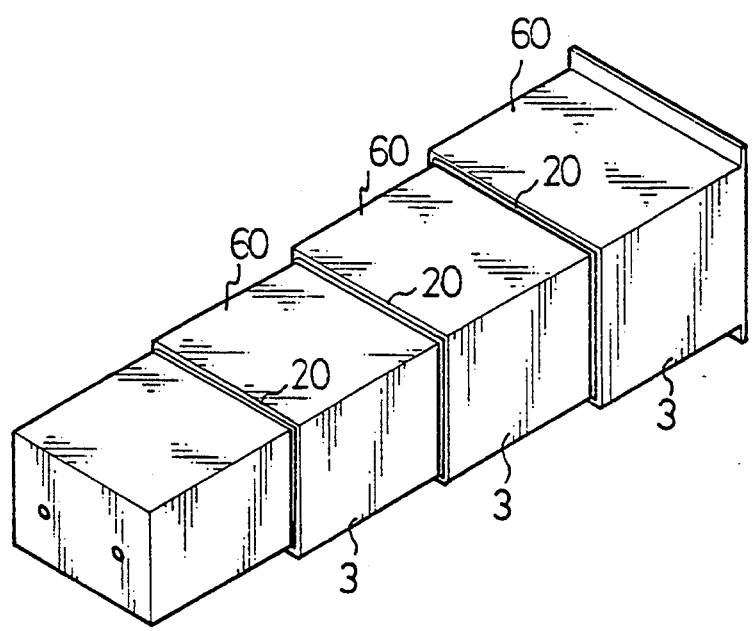
FIG. 1 is a perspective view of a device for clearing iron chips produced during a mechanical working process in accordance with a first embodiment of the present invention.

Referring to FIGS. 1–4, a device in accordance with a first embodiment of the present invention is provided for clearing iron chips produced during a mechanical working process and comprises a plurality of telescopic housings 3 each having an upper plate 30 and a lower plate (not labeled), best seen in FIG. 1. A fastening member 20 is securely attached by means such as brazing to an underside of the upper plate 30 of the telescopic housing 3 (best seen in FIG. 3) and has a first side wall member 22 and a second side wall member 26.

Figure 2:
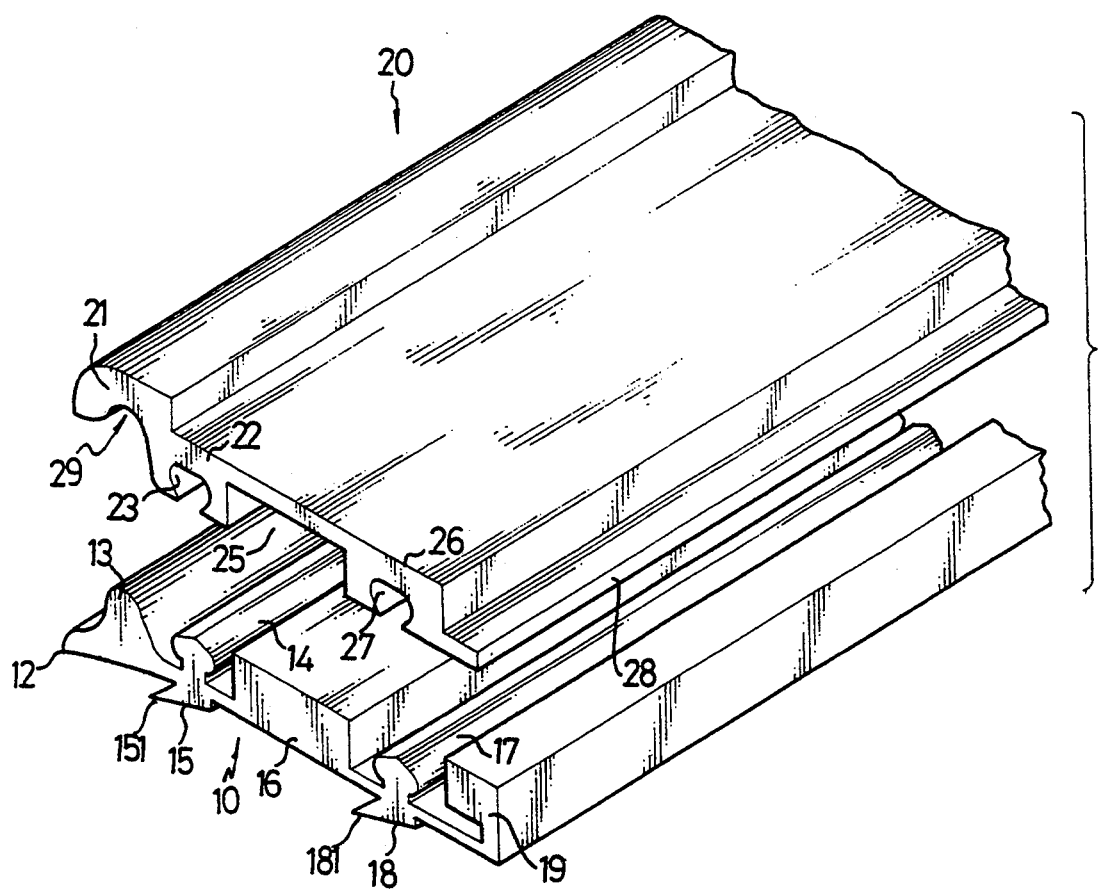
FIG. 2 is an enlarged exploded view of the clearing device as shown in FIG. 1.
Figure 3:
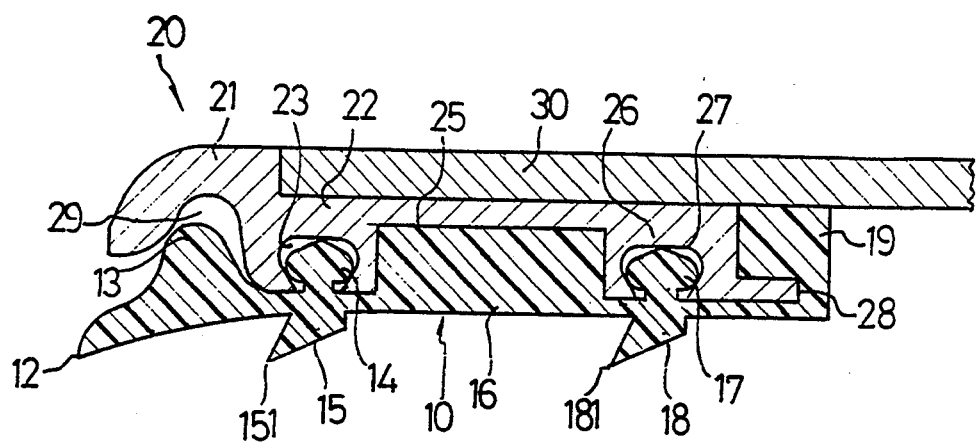
FIG. 3 is an enlarged side cross-sectional assembly view of the clearing device as shown in FIG. 1.

As shown in FIGS. 2 and 3, a recess 25 having a substantially rectangular cross-section is defined in an underside of the fastening member 20 between the first and second side wall members 22 and 26 thereof. A first socket 23 is defined through an underside of the first side wall member 22 and a second socket 27 is defined through an underside of the second side wall member 26. A first lug portion 21 extends outwardly from the first side wall member 22 and a groove 29 having an arc-shaped cross-section is defined in an underside of the first lug portion 21. A first flange portion 28 is laterally formed on the second side wall member 26 and extends outwardly therefrom so as to define an L-shaped protrusion.

A resilient member 10 is securely attached to the fastening member 20 and comprises a block element 16 having a substantially rectangular cross-section which is received in the substantially rectangular recess 25. A first locking element 14 is formed on the first side of the resilient member 10 and is securely received in the first socket 23. A first protrusion portion 15 is formed on an underside of the first locking element 14 and has a first clearing edge portion 151 extending outwardly therefrom for clearing iron chips. A second locking element 17 is formed on the second side of the resilient member 10 and is securely received in the second socket 27. A second protrusion portion 18 is formed on an underside of the second locking element 17 and has a second clearing edge portion 181 extending outwardly therefrom for clearing iron chips. A second lug portion 13 having an arc-shaped cross-section extends from the first side of the resilient member 10 and is partially enclosed in the arc-shaped groove 29. A third clearing edge portion 12 extends outwardly from a distal end of the second arc-shaped lug portion 13 for clearing iron chips produced during a mechanical working process. A second flange portion 19 having an L-shaped cross-section is formed on the second side of the resilient member 10 and is securely mounted on the first flange portion 28 for protecting the first flange portion 28.

Figure 4:
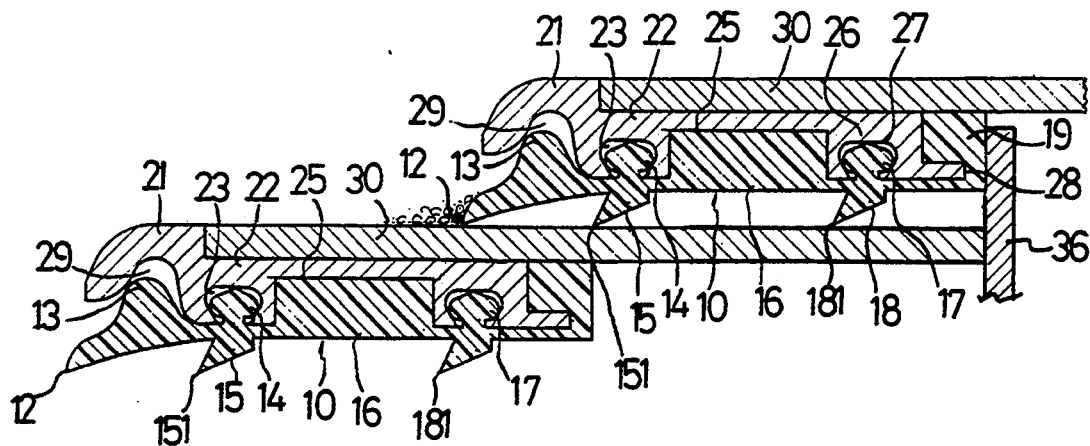
FIG. 4 is an enlarged side cross-sectional action view of the clearing device as shown in FIG. 1, showing how the device clears the iron chips.

In operation, particularly referring to FIGS. 1 and 4, the telescopic housings 3 of the clearing device are initially in fully extended status. The upper plate 30 on a lower position has a distal end portion 36 bearing against the second flange portion 19 of the resilient member 10 on an upper position. The iron chips are initially disposed on the upper plates 30 of the telescopic housings 3. When the telescopic housings 3 are retracted backwards, the third clearing edge portion 12 on an upper position is able to slide over the upper plate 30 on a lower position so as to clear the iron chips thereon. In addition, the first and second clearing edge portions 151 and 181 are able to further clear the iron chips which remain on the upper plate 30 after using the third clearing edge portion 12.

Figure 5:
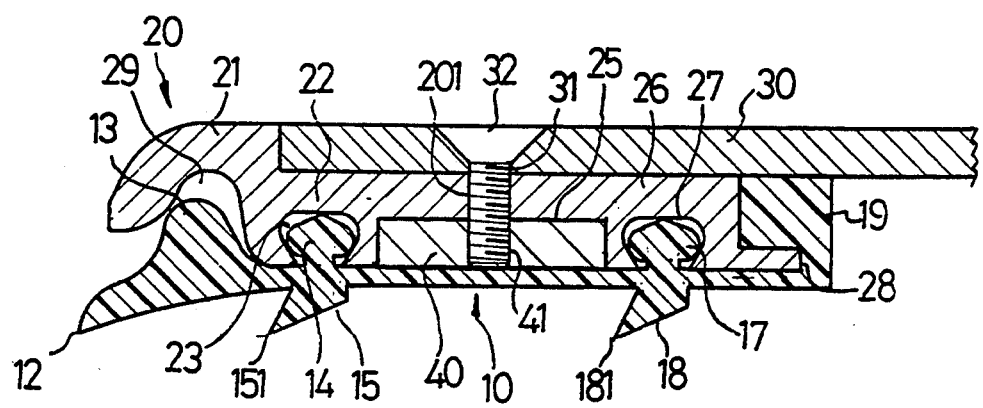
FIG. 5 is a side cross-sectional assembly view in accordance with a second embodiment of the present invention.

Referring to FIG. 5, a device in accordance with a second embodiment of the present invention is provided for clearing iron chips produced during a mechanical working process and comprises a plurality of telescopic housings 3 each having an upper plate 30 and a lower plate. The upper plate 30 has a first threaded hole 31 defined therethrough. A fastening member 20 is securely attached to an underside of the upper plate 30 of the telescopic housing 3 and has a first side wall member 22 and a second side wall member 26. A second threaded hole 201 is defined through the fastening member 20 between the first and second side wall members 22 and 26 for alignment with the first threaded hole 31.

A recess 25 having a substantially rectangular cross-section is defined in an underside of the fastening member 20 between the first and second side wall members 22 and 26 thereof. A block element 40 is received in the rectangular recess 25 and has a third threaded hole 41 defined therethrough for alignment with the second threaded hole 201. A screw 32 is inserted through the first, second, and third threaded holes 31, 201, and 41 for secure engagement between the upper plate 30, the fastening member 20, and the block element 40. A first socket 23 is defined through an underside of the first side wall member 22 and a second socket 27 is defined through an underside of the second side wall member 26. A first lug portion 21 extends outwardly from the first side wall member 22 and a groove 29 having an arc-shaped cross-section is defined in an underside thereof. A first flange portion 28 laterally extends outwardly from the second side wall member 26.

A resilient member 10 is securely attached to the fastening member 20 and comprises a first locking element 14 which is formed on the first side thereof and is securely received in the first socket 23. A first protrusion portion 15 formed on an underside of the first locking element 14 has a first clearing edge portion 151 extending outwardly therefrom. A second locking element 17 formed on the second side of the resilient member 10 is securely received in the second socket 27. A second protrusion portion 18 formed on an underside of the second locking element 17 has a second clearing edge portion 181 extending outwardly therefrom. A second lug portion 13 having an arc-shaped cross-section extends from the first side of the resilient member 10 and is partially enclosed in the arc-shaped groove 29. A third clearing edge portion 12 extends outwardly from a distal end of the second arc-shaped lug portion 13 for clearing iron chips produced during a mechanical working process. A second flange portion 19 having an L-shaped cross-section is formed on the second side of the resilient member 10 and is securely mounted on the first flange portion 28.

Accordingly, by such an arrangement, a clearing device in accordance with the present invention has the following advantages and benefits:

(1) The upper plate 30, the fastening member 20, and the block element 40 are securely engaged with one another, so avoiding improper detachment.

(2) The second flange portion 19 of the resilient member 10 has a resilient and elastomeric feature and is able to protect the first flange portion 28, so avoiding creating noise when in contact with the distal end portion 36 of the upper plate 30 on a lower position.

It should be clear to those skilled in the art that further embodiments of the present invention may be made without departing from the teachings of the present invention.

I claim:

1. A device for clearing iron chips produced during a mechanical working process, comprising:
    a plurality of telescopic housings (3) each having an upper plate (30), two side plates and a lower plate;
    a fastening member (20) securely attached to an underside of said upper plate (30) of said telescopic housing (3) and having a first side wall member (22) and a second side wall member (26);

a recess (25) having a substantially rectangular cross-section being defined in an underside of said fastening member (20) between said first and second side wall members (22) and (26) thereof;

a first socket (23) defined through an underside of said first side wall member (22);

a second socket (27) defined through an underside of said second side wall member (26);

a first lug portion (21) extending outwardly from said first side wall member (22);

a groove (29) having an arc-shaped cross-section being defined in an underside of said first lug portion (21);

a first flange portion (28) laterally formed on said second side wall member (26) and extending outwardly therefrom; and a resilient member (10) securely attached to said fastening member (20) and having a first side and a second side, and comprising:

a block element (16) having a substantially rectangular cross-section being received in said substantially rectangular recess (25);

a first locking element (14) formed on the first side of said resilient member (10) being securely received in said first socket (23);

a first protrusion portion (15) formed on an underside of said first locking element (14) and having a first clearing edge portion (151) extending outwardly therefrom;

a second locking element (17) formed on the second side of said resilient member (10) being securely received in said second socket (27);

a second protrusion portion (18) formed on an underside of said second locking element (17) and having a second clearing edge portion (181) extending outwardly therefrom;

a second lug portion (13) having an arc-shaped cross-section, extending from the first side of said resilient member (10) and being partially enclosed in said arc-shaped groove (29);

a third clearing edge portion (12) extending outwardly from a distal end of said second arc-shaped lug portion (13) for clearing iron chips produced during a mechanical working process; and a second flange portion (19) having an L-shaped cross-section being formed on said second side of said resilient member (10) and being securely mounted on said first flange portion (28).

2. The device for clearing iron chips produced during a mechanical working process in accordance with claim 1, wherein said fastening member (20) is securely attached to the underside of said upper plate (30) of said telescopic housing (3).

3. A device for clearing iron chips produced during a mechanical working process, comprising:

a plurality of telescopic housings (3) each having an upper plate (30), two lower plates and a lower plate, said upper plate (30) having a first threaded hole (31) defined therethrough;

a fastening member (20) securely attached to an underside of said upper plate (30) of said telescopic housing (3) and having a first side wall member (22) and a second side wall member (26), a second threaded hole (201) being defined through said fastening member (20) between said first and second side wall members (22) and (26) for alignment with said first threaded hole (31);

a recess (25) having a substantially rectangular cross-section being defined in an underside of said fastening member (20) between said first and second side wall member (22) and (26) thereof;

a block element (40) received in said rectangular recess (25) and having a third threaded hole (41) defined therethrough for alignment with said second threaded hole (201);

a screw (32) inserted through said first, second, and third threaded holes (31), (201), and (41) for secure engagement between said upper plate (30), said fastening member (20), and said block element (40);

a first socket (23) defined through an underside of said first side wall member (22);

a second socket (27) defined through an underside of said second side wall member (26);

a first lug portion (21) extending outwardly from said first side wall member (22);

a groove (29) having an arc-shaped cross-section being defined in an underside of said first lug portion (21);

a first flange portion (28) laterally formed on said second side wall member (26) and extending outwardly therefrom; and a resilient member (10) securely attached to said fastening member (20) and having a first side and a second side, and comprising:

a first locking element (14) formed on the first side of said resilient member (10) being securely received in said first socket (23);

a first protrusion portion (15) formed on an underside of said first locking element (14) and having a first clearing edge portion (151) extending outwardly therefrom;

a second locking element (17) formed on the second side of said resilient member (10) being securely received in said second socket (27);

a second protrusion portion (18) formed on an underside of said second locking element (17) and having a second clearing edge portion (181) extending outwardly therefrom;

a second lug portion (13) having an arc-shaped cross-section, extending from the first side of said resilient member (10) and being partially enclosed in said arc-shaped groove (29);

a third clearing edge portion (12) extending outwardly from a distal end of said second arc-shaped lug portion (13) for clearing iron chips produced during a mechanical working process; and a second flange portion (19) having an L-shaped cross-section being formed on said second side of said resilient member (10) and being securely mounted on said first flange portion (28).

* * * * *